(12) United States Patent
Shin et al.

(10) Patent No.: US 8,768,395 B2
(45) Date of Patent: Jul. 1, 2014

(54) METHOD AND APPARATUS FOR SETTING COMPUTER CONNECTING MODE IN PORTABLE TERMINAL

(75) Inventors: Heung-Sik Shin, Suwon-si (KR); Sook-Kyung Choi, Suwon-si (KR); Jin-Hyuk Jun, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1177 days.

(21) Appl. No.: 11/961,188

(22) Filed: Dec. 20, 2007

(65) Prior Publication Data
US 2008/0153548 A1 Jun. 26, 2008

(30) Foreign Application Priority Data
Dec. 22, 2006 (KR) .................. 10-2006-0132498

(51) Int. Cl.
*H04N 7/173* (2011.01)
(52) U.S. Cl.
USPC ............... 455/522; 455/428; 725/38; 725/62; 725/45; 725/100; 725/131; 725/37; 710/63
(58) Field of Classification Search
USPC ........ 455/455, 428; 725/38, 62, 45, 100, 131, 725/37; 710/63
See application file for complete search history.

(56) References Cited

U.S. PATENT DOCUMENTS

| | | | |
|---|---|---|---|
| 7,426,402 B2 | 9/2008 | Lee | |
| 7,634,764 B2 * | 12/2009 | Heinz | 717/140 |
| 2003/0217254 A1 * | 11/2003 | Page et al. | 713/2 |
| 2005/0159150 A1 | 7/2005 | Roh et al. | |
| 2006/0068910 A1 * | 3/2006 | Schmidt et al. | 463/40 |
| 2006/0212623 A1 | 9/2006 | Honma | |
| 2007/0105548 A1 * | 5/2007 | Mohan et al. | 455/426.1 |
| 2007/0130356 A1 * | 6/2007 | Boucher et al. | 709/230 |
| 2007/0154870 A1 * | 7/2007 | Ongkojoyo | 434/236 |
| 2007/0169147 A1 * | 7/2007 | Kii | 725/38 |
| 2007/0188519 A1 * | 8/2007 | Kii et al. | 345/619 |
| 2007/0229518 A1 * | 10/2007 | Kii et al. | 345/520 |
| 2008/0016228 A1 * | 1/2008 | Cho | 709/228 |
| 2009/0042608 A1 * | 2/2009 | Moon et al. | 455/556.1 |
| 2009/0198930 A1 * | 8/2009 | Johnson et al. | 711/162 |
| 2009/0300239 A1 * | 12/2009 | Hubo et al. | 710/63 |
| 2010/0079782 A1 * | 4/2010 | Tsuya et al. | 358/1.13 |
| 2012/0102117 A1 * | 4/2012 | Morotomi | 709/204 |
| 2012/0252380 A1 * | 10/2012 | Kawakita | 455/90.2 |

FOREIGN PATENT DOCUMENTS

| | | |
|---|---|---|
| KR | 1020040093323 | 11/2004 |
| KR | 1020050066127 | 6/2005 |
| KR | 1020050076321 | 7/2005 |

\* cited by examiner

*Primary Examiner* — Bobbak Safaipour
(74) *Attorney, Agent, or Firm* — The Farrell Law Firm, P.C.

(57) ABSTRACT

A method and an apparatus for setting a computer connecting mode in a portable terminal. The method includes checking a program executed by a user in the PC when the portable terminal is connected to a personal computer (PC); requesting the portable terminal to perform the connection to the PC using a connecting mode appropriate for a characteristic of the executed program, wherein the connecting mode is one of connecting modes to the PC; and performing the connection to the PC using the connecting mode requested by the PC.

15 Claims, 6 Drawing Sheets

METHOD AND APPARATUS FOR SETTING COMPUTER CONNECTING MODE IN PORTABLE TERMINAL

PRIORITY

This application claims priority under 35 U.S.C. §119 to an application filed in the Korean Intellectual Property Office on Dec. 22, 2006 and assigned Serial No. 2006-0132498, the contents of which are incorporated herein by reference.

BACKGROUND OF THE INVENTION

1. Field of the Invention

The present invention relates generally to a method and an apparatus for setting a computer connecting mode in a portable terminal, and in particular, to a method and an apparatus for automatically changing a computer connecting mode of a portable terminal according to a program executed by a user in a personal computer (PC).

2. Description of the Related Art

Portable terminals typically provide various functions and store mass data. Portable terminals have been increasingly connected to a PC to upload or download specific data. As a result, technology for efficiently transmitting and/or receiving data during a connection between a portable terminal and a PC has been researched and developed.

For example, when a portable terminal is connected to a PC, the portable terminal changes a connecting mode to the PC according to a type of data to be transmitted and/or received or a type of program to be used in order to further efficiently transmit and/or receive data. The portable terminal normally classifies the connecting mode to the PC into a Media Transfer Protocol (MTP) mode, a Universal Serial Bus (USB) mode, and a Mass Storage mode in order to perform a connection to the PC in a corresponding connecting mode according to a type of a program to be executed in the PC. An MTP mode is to transmit and/or receive moving pictures or music files, a USB mode is to transmit and/or receive image files, text files, etc., and a Mass Storage mode is to transmit and/or receive mass data.

Figure 1:
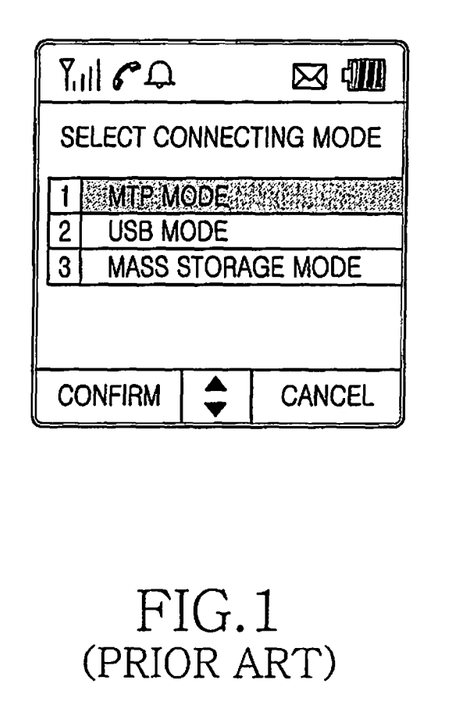
FIG. 1 illustrates a conventional method of setting a computer connecting mode in a portable terminal.

The portable terminal allows a user to directly set the connecting mode to perform the connection to the PC. For example, if the MTP, USB, and Mass Storage modes are set as the connecting mode to the PC in the portable terminal, as shown in FIG. 1, the portable terminal may display the MTP, USB, and Mass Storage modes on a display to request the user to set one of the MTP, USB, and Mass Storage modes.

However, since most users lack professional knowledge of the connecting mode, such as the MTP, USB, and Mass Storage modes, it may be inconvenient for them to manually set the connecting mode of the portable terminal. Accordingly, a need exists for a method of automatically setting or changing a connecting mode in a portable terminal without a manipulation of a user.

SUMMARY OF THE INVENTION

The present invention substantially solves at least the above problems and/or disadvantages and provides at least the advantages below. Accordingly, an aspect of the present invention is to provide a method and an apparatus for setting a computer connecting mode in a portable terminal.

Another aspect of the present invention is to provide a method and an apparatus for automatically changing a connecting mode to a PC in a portable terminal.

A further aspect of the present invention is to provide a method and an apparatus for automatically changing a connecting mode to a PC according to a program, which is executed in the PC, in a portable terminal.

According to one aspect of the present invention, there is provided a method of setting a computer connecting mode of a portable terminal, the method including checking a program executed by a user in a PC when the portable terminal is connected to the PC; requesting the portable terminal to perform the connection to the PC using a connecting mode appropriate for a characteristic of the executed program, wherein the connecting mode is one of connecting modes to the PC; and performing the connection to the PC using the connecting mode requested by the PC.

According to another aspect of the present invention, there is provided a method of setting a computer connecting mode in a portable terminal, the method including receiving from a PC a signal for requesting a connection to the PC using a particular mode of connecting modes necessary between the portable terminal and the PC when the portable terminal is connected to the PC; and performing a connection to the PC using the requested particular connecting mode.

According to a further aspect of the present invention, there is provided a method of setting a computer connecting mode of a portable terminal in a PC, the method including checking a program executed by a user when the PC is connected to the portable terminal; determining a particular mode appropriate for a characteristic of the executed program among connecting modes necessary between the portable terminal and the PC; and transmitting to the portable terminal a signal for requesting the portable terminal to perform a connection to the PC using the determined particular mode.

According to still another aspect of the present invention, there is provided an apparatus for setting a computer connecting mode in a portable terminal, the apparatus including a communication module receiving from a PC a signal for requesting the portable terminal to perform the connection to the PC using a particular mode of connecting modes necessary between the portable terminal and the PC when the portable terminal is connected to the PC; and a connecting mode setter performing the connection to the PC using the requested particular mode.

According to still further another aspect of the present invention, there is provided an apparatus for setting a computer connecting mode of a portable terminal in a PC, the apparatus including a program executor sensing a program executed by a user when the PC is connected to the portable terminal; a connection manager determining a particular mode appropriate for a characteristic of the sensed program among connecting modes necessary between the portable terminal and the PC to generate a signal for requesting the portable terminal to perform the connection to the PC using the particular mode; and a communication module transmitting the signal generated by the connection manager to the portable terminal.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method and an apparatus for automatically changing a connecting mode to a personal computer (PC) according to a program, which is executed in the PC, in a portable terminal.

A portable terminal may include a plurality of connecting modes as connecting modes to a PC. As described herein, a portable terminal includes a Media Transfer Protocol (MTP) mode, a Universal Serial Bus (USB) mode, and a Mass Storage mode as the connecting mode to the PC. An MTP mode is to transmit and/or receive moving pictures or music files, a USB mode is to transmit and/or receive image or text files, and a Mass Storage mode is to transmit and/or receive mass data.

Figure 2:
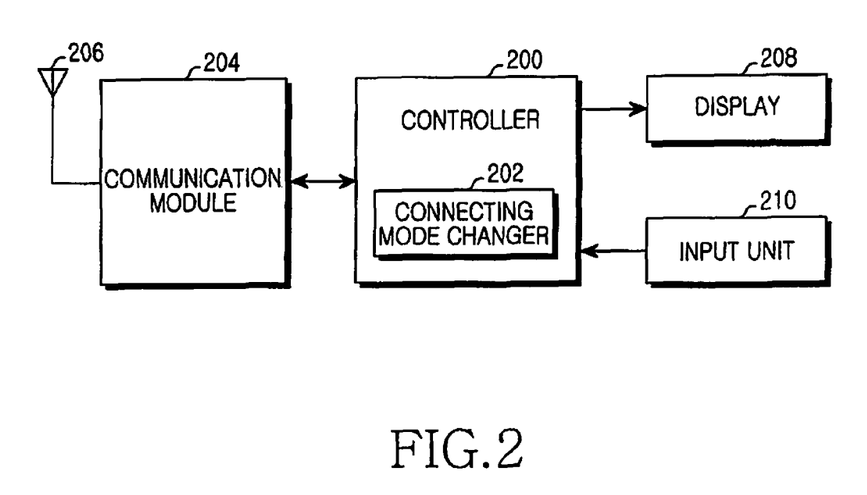
FIG. 2 is a block diagram of a portable terminal according to the present invention.

FIG. 2 shows a portable terminal according to the present invention. In FIG. 2, the portable terminal includes a controller 200 having a connecting mode changer 202, a communication module 204, an antenna 206, a display 208, and an input unit 210.

The controller 200 controls and processes operations for voice and data communications. In particular, according to the present invention, when the portable terminal is connected to a PC by cable, the controller 200 may perform the connection to the PC using a connecting mode which is set as a basic mode. The controller 200 may also include the connecting mode changer 202 to control and process functions of determining a connecting mode requested by the PC and changing a current connecting mode into the requested connecting mode.

The connecting mode changer 202 analyzes a connecting mode changing request signal, which is received from the PC through the communication module 204, to check a connecting mode into which the current connecting mode is to be changed.

The communication module 204 transmits and/or receives a Radio Frequency (RF) signal of data which is input and output through the antenna 206. According to the present invention, the communication module 204 may receive the connecting mode changing request signal from the PC, provide the connecting mode changing request signal to the controller 200, and perform the connection to the PC in the connecting mode requested by the PC under the control of the controller 200.

The display 208 displays state information and limited numerals and characters which are generated during an operation of the portable terminal. In particular, according to the present invention, the display 208 may display a message indicating that the current connecting mode is to be changed into the connecting mode requested by the PC. The input unit 210 includes a plurality of function keys to provide the controller 200 with data corresponding to a key pressed by a user.

Figure 3:
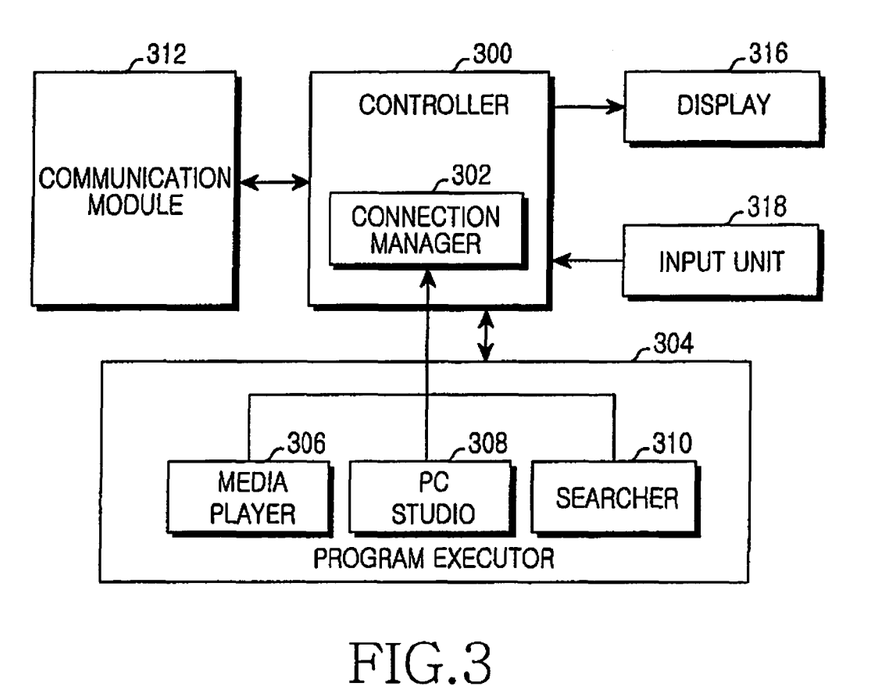
FIG. 3 is a block diagram of a PC according to the present invention.

FIG. 3 shows a PC according to the present invention. In FIG. 3, the PC includes a controller 300 having a connection manager 302, a program executor 304, a media player 306, a PC studio 308, a searcher 310, a communication module 312, a display 316, and an input unit 318.

The controller 300 processes and controls an overall function of the PC. According to the present invention, the controller 300 may include the connection manager 302 to control and process a function of transmitting a signal for requesting a portable terminal to change a current connecting mode into a connecting mode appropriate for a program executed by a user. The portable terminal is connected to the PC in a basic mode.

The connection manager 302 senses whether the PC is connected to the portable terminal, senses the program executed by the user through the program executor 304 when the PC is connected to the portable terminal, and generates the signal for requesting the change into the connecting mode appropriate for a characteristic of the executed program. For example, if the connection manager 302 senses an execution of the media player 306 which plays moving pictures or music files, the connection manager 302 may generate a signal for requesting a change into Media Transfer Protocol (MTP) mode in which moving pictures or music files are transmitted and/or received. If the connection manger 302 senses an execution of the PC studio 308 which manages image or text files, the connection manager 302 may generate a signal for requesting a change into a USB mode in which image or text files are transmitted and/or received. If the connection manager 302 senses an execution of the searcher 310 which searches a storage device, the connection manager 302 may generate a signal for requesting a change into a Mass Storage mode in which mass data is transmitted and/or received.

The connection manager 302 may generate the signal for requesting the change into the connecting mode using an attention (AT) command or an operation (OP) code. In other words, if a program requiring a change of a connecting mode is executed when the PC is connected to the portable terminal in the USB mode, the connection manager 302 may generate a signal for requesting a change from the USB mode into another connecting mode using the AT command which can be analyzed by the portable terminal which operates in the USB mode. If the program is executed when the PC is connected to the portable terminal in the MTP mode, the connection manager 302 may generate the signal using the OP code which can be analyzed by the portable terminal which operates in the MTP mode. For example, if the AT command includes a command 'CHANGEMODE' indicating a mode change and a code '1' indicating the MTP mode, the connection manager 302 may generate a signal "AT+CHANGEMODE=1" to request a change from the USB mode into the MTP mode. If the OP code having four fields includes a code '0x9001' indicating a mode change, a code '0x02' indicating uses of two parameters, a code '0x2051' indicating a change into another connecting mode, and a code '0x2052' indicating a change into the USB mode, the connection manager 302 may generate a signal '0x9001 0x02 0x2051 0x2052' to request a change from the MTP mode into the USB mode.

Also, the connection manger 302 may be constantly positioned on a window of the PC to operate from when the portable terminal is connected to the PC to manage a change of a connecting mode of the portable terminal. Alternatively, the connection manger 302 may be included in a specific program to operate from when the portable terminal is connected to the PC and the specific program is executed to manage the change of the connecting mode of the portable terminal.

The program executor 304 includes a plurality of programs and executes a program selected by a user. In particular, according to the present invention, when the media player 306, the PC studio 308, and the searcher 310 are executed, the program executor 304 may output a signal for reporting an execution of a corresponding program to the connection manager 302.

The communication module 312 processes signals transmitted to and/or received from the portable terminal which is connected to the PC by a cable. According to the present invention, the communication module 312 may be controlled by the connection manager 302 to transmit a signal for requesting a change of the connecting mode to the portable terminal.

The display 316 displays state information and limited numerals and characters which are generated during an operation of the PC. The input unit 318 includes a plurality of function keys and provides the controller 300 with data corresponding to a key pressed by the user.

Figure 4:
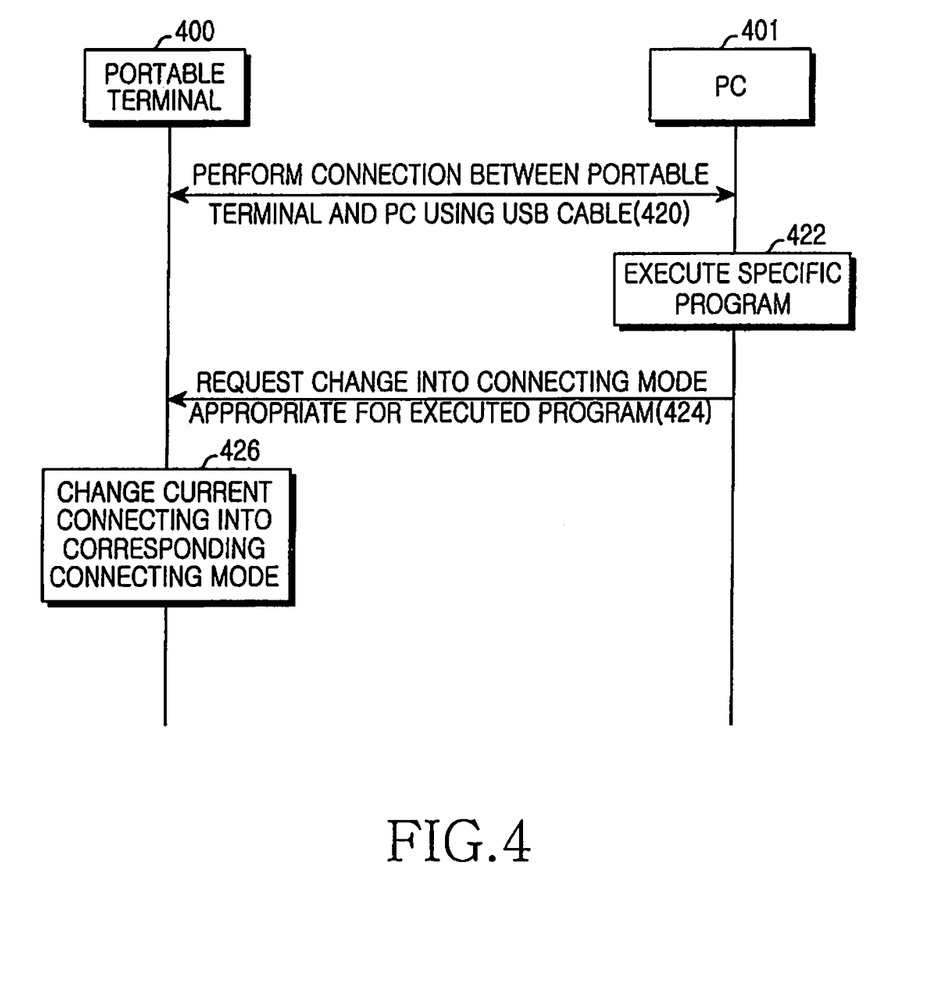
FIG. 4 is a flowchart of a signal for changing a connecting mode between a portable terminal and a PC according to the present invention.

FIG. 4 shows a signal process for changing a connecting mode between a portable terminal and a PC according to the present invention.

Referring to FIG. 4, in step 420, a portable terminal 400 and a PC 401 are connected to each other through a USB cable. In step 422, the PC 410 determines whether a user is to execute a particular program of programs using the connection to the portable terminal 400. For example, the PC 410 may determine whether the media player 306, the PC studio 308 or the searcher 310 is to be executed.

If it is determined in step 422 that the user is to execute the particular program, the PC 410 proceeds to step 424 to transmit to the portable terminal 400 a signal for requesting a change into a connecting mode appropriate for a characteristic of the executed particular program. In step 426, the portable terminal 400 changes a current connecting mode into the connecting mode requested by the PC 410 to perform the connection to the PC 410.

For example, if the media player 306 playing moving pictures or music files is executed, the PC 410 may request the portable terminal 400 to change the current connecting mode into an MTP mode. If the PC studio 310 transmitting and/or receiving image or text files is executed, the PC 410 may request the portable terminal 400 to change the current connecting mode into a USB mode. If the searcher 308 searching a storage device is executed, the PC 410 may request the portable terminal 400 to change the current connecting mode into a Mass Storage mode. Also, the portable terminal 400 may perform the connection to the PC 410 using one of the MTP, USB, and Mass Storage modes according to the request of the PC 410.

The portable terminal ends the present process.

Figure 5:
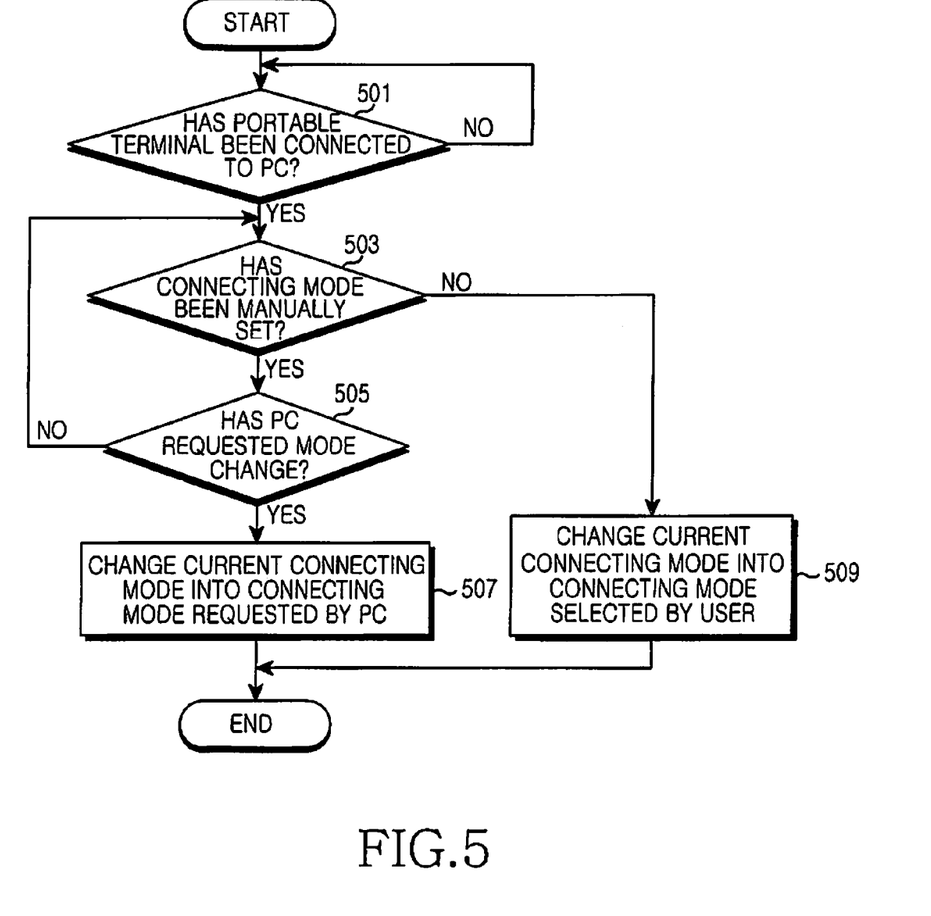
FIG. 5 is a flowchart of a process of changing a connecting mode to a PC in a portable terminal according to the present invention.

FIG. 5 shows a process of changing a computer connecting mode in a portable terminal according to the present invention. In step 501, the portable terminal determines whether the portable terminal has been connected to a PC. If it is determined in step 501 that the portable terminal has been connected to the PC, the portable terminal proceeds to step 503 to determine whether a connecting mode has been manually set through a key manipulation of a user. If it is determined in step 503 that the connecting mode has been manually set through the key manipulation of the user, the portable terminal goes to step 509 to perform a connection to the PC using the connecting mode set by the user and then ends the present process.

If it is determined in step 503 that the connecting mode has not been manually set through the key manipulation of the user, the portable terminal proceeds to step 505 to determine whether a signal for requesting a change of the connecting mode has been received from the PC connected to the portable terminal. If it is determined in step 505 that the signal has been received from the PC, the portable terminal proceeds to step 507 to analyze the signal to check a connecting mode requested by the PC and perform the connection to the PC using the checked connecting mode. The portable terminal ends the present process.

Figure 6:
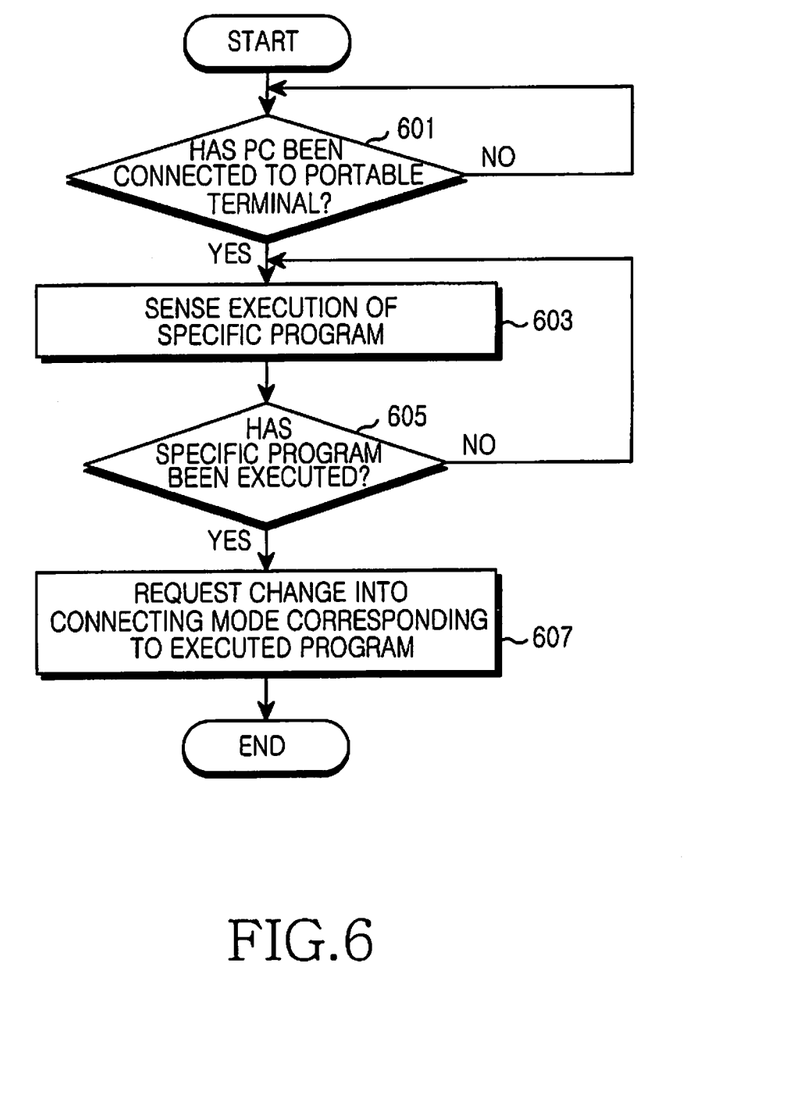
FIG. 6 is a flowchart of a process of requesting a portable terminal to change a connecting mode in a PC according to the present invention.

FIG. 6 shows a process of requesting a portable terminal to change a connecting mode in a PC according to the present invention. In step 601, the PC determines whether the PC has been connected to a portable terminal. If it is determined in step 601 that the PC has been connected to the portable terminal, the PC proceeds to step 603 to sense whether a program using the connection to the portable terminal is to be executed. In step 605, the PC determines whether the program has been executed. If it is determine in step 605 that the program has been executed, the PC proceeds to step 607 to determine a connecting mode appropriate for a characteristic of the executed program to transmit to the portable terminal a signal for requesting a change into the determined connecting mode.

The PC ends the present process.

In accordance with the present invention as described above, a connecting mode of a portable terminal can be automatically changed according to a type of a program executed in a PC when the portable terminal is connected to the PC. Thus, a user can set a connecting mode suitable for the executed program without setting or changing the connecting mode.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of setting a computer connecting mode of a portable terminal, the method comprising:
   setting, by the portable terminal and a Personal Computer (PC), a first connecting mode between the portable terminal and the PC, when the portable terminal is connected to the PC through a Universal Serial Bus (USB) cable;
   if an execution of a program by a user is detected during the first connecting mode, requesting, by the PC, the portable terminal to change from the first connecting mode to a second connecting mode corresponding to the executed program among a plurality of programs included in the PC without control of the user, wherein the second connecting mode is one of connecting modes to the PC; and
   performing, by the PC and the portable terminal, the connection to the PC using the second connecting mode requested by the PC,
   wherein each of the programs correspond to different connecting modes and perform different functions.

2. The method of claim 1, wherein the second connecting mode comprises at least one of a Media Transfer Protocol (MTP) mode, a USB mode, and a Mass Storage mode, wherein the MTP mode is to transmit/receive one of a moving picture and a music file, the USB mode is to transmit/receive one of image and text files, and the Mass Storage mode is to transmit/receive mass data.

3. The method of claim 1, wherein the PC requests the portable terminal to change from the first connecting mode to the second connecting mode corresponding to the executed program using one of an attention (AT) command and an operation (OP) code.

4. A method of setting a computer connecting mode in a portable terminal, the method comprising:
setting a first connecting mode when the portable terminal is first connected to a Personal Computer (PC) through a Universal Serial Bus (USB) cable;
receiving from the PC a signal for changing from the first connecting mode to a second connecting mode corresponding to an executed program in the PC among a plurality of connecting modes when the portable terminal is connected to the PC; and
performing a connection to the PC using the requested second connecting mode,
wherein each of the connecting modes correspond to different programs,
wherein each program performs a different function, and
wherein the signal is received, if the execution of the program by the user in the PC is detected.

5. The method of claim 4, wherein the second connecting mode comprises at least one of a Media Transfer Protocol (MTP) mode, a USB mode, and a Mass Storage mode, wherein the MTP mode is to transmit/receive one of a moving picture and a music file, the USB mode is to transmit/receive one of image and text files, and the Mass Storage mode is to transmit/receive mass data.

6. The method of claim 4, wherein the signal comprises one of an attention (AT) command and an operation (OP) code.

7. A method of setting a computer connecting mode of a portable terminal in a Personal Computer (PC), the method comprising:
setting a first connecting mode when the portable terminal is first connected to the PC through a Universal Serial Bus (USB) cable; and
if an execution of a program by a user is detected during the first connecting mode, transmitting, to the portable terminal, a signal for changing from the first connecting mode to a second connecting mode corresponding to the executed program among connecting modes necessary between the portable terminal and the PC without control of the user,
wherein each of the programs correspond to different connecting modes and perform different functions.

8. The method of claim 7, wherein the second connecting mode comprises at least one of a Media Transfer Protocol (MTP) mode, a USB mode, and a Mass Storage mode, wherein the MTP mode is to transmit/receive one of a moving picture and a music file, the USB mode is to transmit/receive one of image and text files, and the Mass Storage mode is to transmit/receive mass data.

9. The method of claim 7, wherein the signal comprises one of an attention (AT) command and an operation (OP) code.

10. An apparatus for setting a computer connecting mode in a portable terminal, the apparatus comprising:
a communication module receiving from a Personal Computer (PC) a signal for changing from a first connecting mode to a second connecting mode corresponding to an executed program in the PC of connecting modes necessary between the portable terminal and the PC when the portable terminal is connected to the PC; and
a connecting mode setter performing the connection to the PC using the first connecting mode when the portable terminal is first connected to the PC through a Universal Serial Bus (USB) cable, and then performing the connection to the PC using the second connecting mode,
wherein the signal is received if the execution of the program by the user in the PC is detected.

11. The apparatus of claim 10, where the second connecting mode comprises at least one of a Media Transfer Protocol (MTP) mode, a USB mode, and a Mass Storage mode, wherein the MTP mode is to transmit/receive one of a moving picture and a music file, the USB mode is to transmit/receive one of image and text files, and the Mass Storage mode is to transmit/receive mass data.

12. The apparatus of claim 10, wherein the signal comprises one of an attention (AT) command and an operation (OP) code.

13. An apparatus for setting a computer connecting mode of a portable terminal in a Personal Computer (PC), the apparatus comprising:
a program executor detecting a program executed by a user among a plurality of programs included in the PC when the PC is connected to the portable terminal;
a connection manager setting a first connecting mode when the portable terminal is first connected to the PC through a Universal Serial Bus (USB) cable, and, if an execution of the program by the user is detected during the first connecting mode, determining a second connecting mode corresponding to the executed program among connecting modes necessary between the portable terminal and the PC to generate a signal for changing from the first connecting mode to the second connecting mode without control of the user; and
a communication module transmitting the signal generated by the connection manager to the portable terminal,
wherein each of the programs correspond to different connecting modes and perform different functions.

14. The apparatus of claim 13, wherein the second connecting mode comprises at least one of a Media Transfer Protocol (MTP) mode, a USB mode, and a Mass Storage mode, wherein the MTP mode is to transmit/receive one of a moving picture and a music file, the USB mode is to transmit/receive one of image and text files, and the Mass Storage mode is to transmit/receive mass data.

15. The apparatus of claim 13, wherein the connection manager generates the signal using one of an attention (AT) command and an operation (OP) code.

* * * * *